United States Patent [19]

Shimazaki

[11] Patent Number: 5,019,896
[45] Date of Patent: May 28, 1991

[54] METHOD FOR FORMING HALFTONE DATA

[75] Inventor: Osamu Shimazaki, Kaisei, Japan

[73] Assignee: Fuji Photo Film Co., Ltd, Kanagawa, Japan

[21] Appl. No.: 420,414

[22] Filed: Oct. 12, 1989

[30] Foreign Application Priority Data

Oct. 13, 1988 [JP] Japan .................. 63-258229

[51] Int. Cl.$^5$ ............................. H04N 1/40
[52] U.S. Cl. ......................... 358/75; 358/78; 358/80; 358/456
[58] Field of Search ............ 358/75, 78, 80, 456

[56] References Cited

U.S. PATENT DOCUMENTS

| | | | |
|---|---|---|---|
| 3,922,484 | 11/1975 | Keller | 358/75 |
| 4,543,613 | 9/1985 | Sakamoto | 358/75 |
| 4,547,814 | 10/1985 | Hirosawa | 358/75 |
| 4,635,133 | 1/1987 | Nys et al. | 355/79 |
| 4,719,506 | 1/1988 | Van Buren | 358/80 |
| 4,811,108 | 3/1989 | Numakura et al. | 358/456 |
| 4,814,797 | 3/1989 | Haneda et al. | 358/80 |

FOREIGN PATENT DOCUMENTS 0235631 9/1987 European Pat. Off. .
0303190 2/1989 European Pat. Off. .
0296563 12/1988 Japan .
2172169 9/1986 United Kingdom .

Primary Examiner—Howard W. Britton
Attorney, Agent, or Firm—Sughrue, Mion, Zinn, Macpeak & Seas

[57] ABSTRACT

This invention is a method for forming halftone data which is characterized in that when an original comprising color images of a continuous tone is scanned to obtain image signals, and the image signals are superposed with halftone screen signals which are electrically generated in order to form multicolor separated halftone gradation images which are reproducible by printing, the difference in percentage of blackened pixels between a first contact (dot matrix corner) and a second contact (dot matrix corner) in square dots is about 2% or higher. Further, this invention relates to a method for forming halftone data, which is that when an original comprising color images of a continuous tone is scanned to obtain image signals, and the image signals are superposed with halftone screen signals which are electrically generated in order to form multicolor separated halftone gradation images whch are reproducible by printing, the difference in dot percentage between one stage of dot where a blackened portion starts and another stage or where a whitened portion ends is about 2% or higher.

4 Claims, 15 Drawing Sheets

| | | | | | | | | | | | | |
|---|---|---|---|---|---|---|---|---|---|---|---|---|
|255|246|228|199|163|137|128|133|152|191|221|241|253|
|254|245|227|198|162|136|126|132|151|190|220|241|253|
|252|244|226|198|161|136|124|131|151|189|219|240|251|
|250|244|226|197|161|135|123|130|150|189|219|239|249|
|250|238|225|196|160|122|121|121|149|188|218|236|248|
|247|233|217|187|159|115|114|114|148|180|213|232|247|
|243|235|216|186|148|108|107|106|143|179|212|232|242|
|238|231|211|185|147|102|101|100|142|179|206|229|237|
|234|224|205|178|108|93|93|92|105|170|201|222|233|
|230|216|204|177|102|82|80|80|99|170|200|213|229|
|223|210|195|169|94|81|69|79|91|164|192|207|223|
|215|210|185|158|83|70|62|68|78|153|181|207|214|
|209|204|176|103|71|62|54|61|68|99|172|201|208|
|203|195|176|95|64|55|45|53|60|90|171|192|202|
|194|184|168|83|63|46|37|44|59|77|164|182|193|
|183|175|158|72|56|38|33|37|53|67|154|173|182|
|174|167|105|71|46|34|28|32|43|66|98|165|173|
|167|157|104|65|39|28|21|27|36|59|97|155|166|
|156|146|96|65|35|22|15|20|31|58|90|144|155|
|145|142|96|57|34|16|12|15|31|52|89|139|145|
|141|120|88|56|30|14|9|12|26|51|77|113|140|
|139|119|87|50|29|13|6|11|25|43|76|112|138|
|134|118|87|49|25|10|3|9|19|42|75|111|133|
|130|117|86|49|24|8|2|5|19|41|74|111|129|
|127|117|85|48|23|7|1|4|18|40|74|110|125|
|127|116|84|47|22|6|0|3|17|40|73|109|124|
|126|116|84|47|22|6|0|3|17|39|73|109|124|
|127|116|85|48|23|7|1|4|17|40|73|110|125|
|129|117|85|48|23|8|2|5|18|41|74|110|128|
|134|118|86|49|24|10|2|8|19|42|75|111|133|
|138|119|87|50|29|13|5|11|25|42|76|112|138|
|141|119|88|56|29|14|9|11|26|51|76|113|140|
|145|141|95|57|34|16|12|14|30|51|88|139|144|
|156|146|96|64|35|21|15|20|31|57|88|144|155|
|166|156|104|65|39|28|20|26|36|58|97|154|165|
|174|167|104|71|46|33|27|32|43|66|97|165|173|
|183|175|157|72|55|38|32|36|52|66|153|172|182|
|193|184|168|83|63|45|37|44|59|77|164|181|193|
|202|194|175|94|63|54|45|53|60|90|171|192|202|
|209|203|176|103|70|62|54|60|67|98|172|201|208|
|215|209|184|158|82|70|61|68|78|153|181|206|214|
|223|210|195|168|94|81|69|79|91|163|191|207|222|
|230|215|204|177|102|82|80|79|99|169|199|213|229|
|233|224|205|178|108|93|92|91|105|170|200|221|233|
|237|230|211|185|147|101|100|100|142|178|206|228|236|
|243|234|216|186|147|107|107|106|143|179|212|231|242|
|247|235|217|187|159|115|114|113|148|180|212|232|246|
|249|238|224|196|159|122|121|120|149|187|218|236|248|
|250|243|225|196|160|134|122|130|150|188|218|239|249|
|252|244|226|197|161|135|123|131|150|189|219|240|251|
|254|245|227|198|162|136|125|131|151|190|220|240|252|
|255|246|227|199|162|137|128|132|152|190|221|241|253|

FIG. 7

MAIN SCANNING DIRECTION

| 23 | 19 | 12 | 18 | 22 | 28 | 32 | 39 | 33 | 29 |
|----|----|----|----|----|----|----|----|----|----|
| 15 | 7  | 2  | 6  | 14 | 36 | 44 | 49 | 45 | 37 |
| 11 | 5  | 1  | 4  | 10 | 40 | 46 | 50 | 47 | 41 |
| 17 | 9  | 3  | 8  | 16 | 34 | 42 | 48 | 43 | 35 |
| 25 | 21 | 13 | 20 | 24 | 26 | 30 | 38 | 31 | 27 |
| 28 | 32 | 39 | 33 | 29 | 23 | 19 | 12 | 18 | 22 |
| 36 | 44 | 49 | 45 | 37 | 15 | 7  | 2  | 6  | 14 |
| 40 | 46 | 50 | 47 | 41 | 11 | 5  | 1  | 4  | 10 |
| 34 | 42 | 48 | 43 | 35 | 17 | 9  | 3  | 8  | 16 |
| 26 | 30 | 38 | 31 | 27 | 25 | 21 | 13 | 20 | 24 |

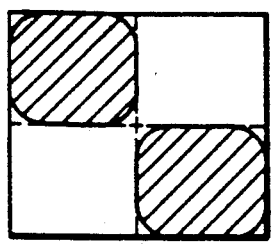 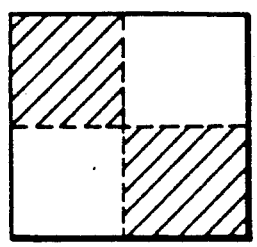 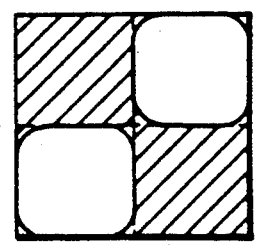
F I G. 14A　　F I G. 14B　　F I G. 14C
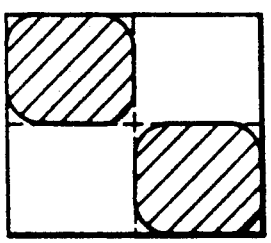 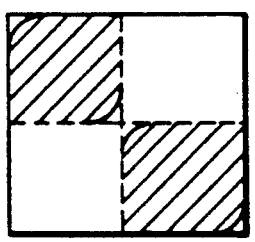 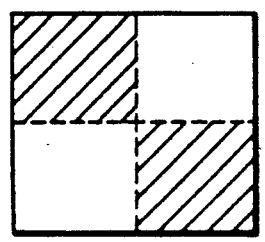
F I G. 15A　　F I G. 15B　　F I G. 15C
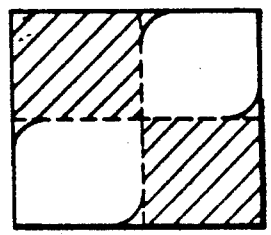
F I G. 15D

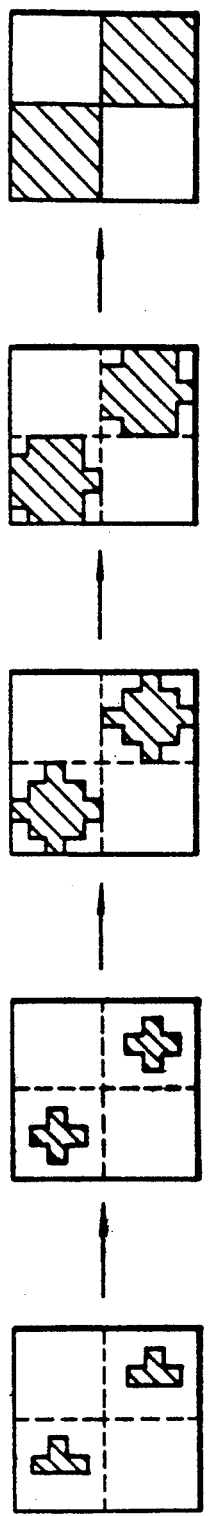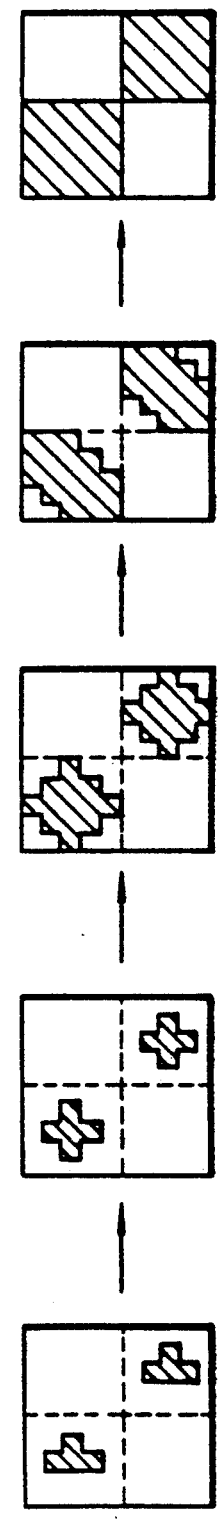

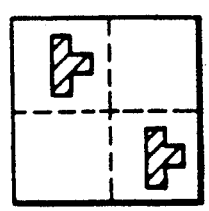 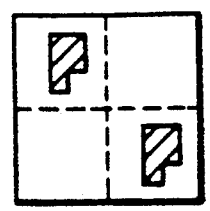 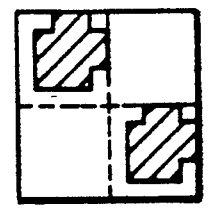
F I G. 18A  F I G. 18B  F I G. 18C
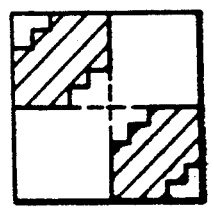 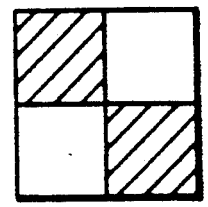
F I G. 18D  F I G. 18E

MAIN SCANNING DIRECTION ↓

| 25 | 23 | 12 | 16 | 18 | 26 | 28 | 39 | 35 | 33 |
|----|----|----|----|----|----|----|----|----|----|
| 21 | 7  | 2  | 6  | 14 | 30 | 44 | 49 | 45 | 37 |
| 11 | 5  | 1  | 4  | 10 | 40 | 46 | 50 | 47 | 41 |
| 15 | 9  | 3  | 8  | 20 | 36 | 42 | 48 | 43 | 31 |
| 19 | 17 | 13 | 22 | 24 | 32 | 34 | 38 | 29 | 27 |
| 26 | 28 | 39 | 35 | 33 | 24 | 23 | 12 | 16 | 18 |
| 30 | 44 | 49 | 45 | 37 | 21 | 7  | 2  | 6  | 14 |
| 40 | 46 | 50 | 47 | 41 | 11 | 5  | 1  | 4  | 10 |
| 36 | 42 | 48 | 43 | 31 | 15 | 9  | 3  | 8  | 20 |
| 32 | 34 | 38 | 29 | 27 | 19 | 17 | 13 | 22 | 25 |

FIG. 19

MAIN SCANNING DIRECTION ↓

| 25 | 23 | 12 | 13 | 14 | 26 | 28 | 39 | 36 | 33 |
|----|----|----|----|----|----|----|----|----|----|
| 21 | 8  | 2  | 5  | 11 | 30 | 43 | 49 | 46 | 40 |
| 15 | 7  | 1  | 4  | 10 | 37 | 44 | 50 | 47 | 41 |
| 16 | 9  | 3  | 6  | 20 | 35 | 42 | 48 | 45 | 31 |
| 19 | 18 | 17 | 22 | 24 | 32 | 34 | 38 | 29 | 27 |
| 26 | 28 | 39 | 36 | 33 | 25 | 23 | 12 | 13 | 14 |
| 30 | 43 | 49 | 46 | 40 | 21 | 8  | 2  | 5  | 11 |
| 37 | 44 | 50 | 47 | 41 | 15 | 7  | 1  | 4  | 10 |
| 35 | 42 | 48 | 45 | 31 | 16 | 9  | 3  | 6  | 20 |
| 32 | 34 | 38 | 29 | 27 | 19 | 18 | 17 | 22 | 24 |

FIG. 21

METHOD FOR FORMING HALFTONE DATA

BACKGROUND OF THE INVENTION

1. Field of the Invention

This invention relates to a method for forming halftone data for flat bed type color scanners or the like, and more particularly to a method for forming the halftone data which takes into consideration the difference in halftone screen percentage of respective dots in order to avoid a tone jump when image signals are obtained by scanning an original comprising color images in continuous tone, and are superposed with halftone screen signals which are electrically generated so as to form four-color separated halftone gradation images in C (cyan), M (magenta), Y (yellow) and K (black).

2. Description of the Prior Art

In the fields of printing and plate-making, the image scanning/reading/recording/systems which electrically process image information of an original for forming original film plates for printing have been widely used in recent years in order to rationalize the process and improve the image quality.

Such an image scanning/reading/recording system comprises basically an input section, a controller and an output section. More particularly, the system includes an input section where image signals are picked up by the illumination, color separation and photometric systems to convert image information photoelectrically, and the controller which processes the information in arithmetic operation such as gradation correction, color correction, contour emphasis, conversion from R (red), G (green), B (blue)→C, M, Y, K and the like depending on the plate-making conditions. The processed image information is converted into optical signals such as laser beams by the output section to be printed in the form of images on a recording medium comprising a photosensitive material. The medium is developed by a predetermined developing device and used for printing and so on as the original film plates.

When the original to be printed is a photograph or a painting of continuous tone images, the original should be divided into dots to express the density of images. The continuous tone images are therefore transformed into halftone gradation images which are a group of dots in sizes which are different depending on the density thereof. As a method for forming such dots, there has been proposed a method which irradiates optical signals depending on the continuous tone images on a recording medium via a contact screen placed on a film. The contact screen comprises arrays of dots with blurred circumferences. There is usually employed in the image scanning/reading/recording system a method which electrically forms a halftone screen which is equivalent to the contact screen.

A good example of the prior art methods of forming a halftone screen, disclosed in Japanese Patent Publication (kokoku) No. 49361/1977, is briefly described below.

In FIG. 1, the reference numeral 100 denotes a basic periodic section of the halftone screen which is electrically formed. The halftone screen formed by repetition of the same pattern, and the minimum unit thereof is the basic periodic section 100. The basic periodic section 100 comprises eight scanning lines $S_1$, through $S_8$ arranged in parallel to each other in the direction of Y axis. The scanning lines $S_1$ through $S_8$ form respectively parts of the basic periodic 100 with unique voltage signals which change along the recording direction X. The respective voltages of the scanning lines $S_1$, $S_2$, $S_4$ and $S_5$ are set at a high level when they are passing through point A and point D in a dot section 101 while the voltage of the scanning line $S_3$ is set at a low level when it passes through the point E. The voltages of the respective scanning lines $S_1$ through $S_5$ are set to gradually decrease from the points A through D toward the point E. The voltage signals at the scanning lines $S_1$ through $S_8$ may be formed into the halftone screen signals by, for example, superposing plural alternating voltage signals of a triangle shape of different periods and gradually shifting their phases for each scanning line.

When multicolor images and so on are formed into dots for reproduction, it is necessary to generate plural halftone screens and to superpose the halftone gradation images which are formed by the plural halftone screens. The halftone screens are formed respectively in the form rotated from the recording direction X at a predetermined angle $\theta$ in order to prevent generation of Moire patterns at the time of superposing.

A basic periodic section 100 which is formed as above is generated periodically at a frequency sufficient to cover the scanning area of the original to form the halftone screen. The halftone screen signals forming such a halftone screen are superposed with the image signals which are optically read from the original at the input section of the image scanning/reading/recording system in order to form the halftone gradation images on the original film plate.

A halftone plate of an area modulation type for color printing is characterized by the number of screen lines (e.g. the number of lines/inch: LPI), the screen angle (m/n) and the dot patterns. The screen angle is a rational number defined by m/n of FIG. 1, and is required for each of four colors of the four colors of C, M, Y and K. The screen angle and the dot patterns are formed with the method disclosed in Japanese Patent Publication No. 49361/1977 mentioned above. An arbitrary number of the screen lines may easily be obtained in the drum type color scanners simply by changing the imaging magnification with optical zooming, but in the flat bed (plane) type color scanners, the optical zooming is quite difficult. In the color scanners of the flat bed type, it is necessary to optically conduct main scanning of a light spot due to its high speed processing, and it is almost impossible to further add an additional mechanism for zooming to the system. Moreover, the control system has to be made bigger and more complex in order to change the size of the light spot or pitches.

It is further necessary to prevent generation of a tone jump or coupling of adjacent blackened portions of the dots.

SUMMARY OF THE INVENTION

This invention was made to eliminate such conventional problems and aims to provide a halftone data forming method for flat bed type color scanners which can change the number of screen lines arbitrarily without changing the scanning pitch or the size of the light spot and which can prevent generation of tone jumps.

According to one aspect of this invention, for achieving the objects described above, there is provided a method for forming halftone data which is characterized in that when an original comprising color images of a continuous tone is scanned to obtain image signals, and the image signals are superposed with halftone screen signals which are electrically generated in order to form multicolor separated halftone gradation images which are reproducible by printing, the difference in percentage of blackened pixels between a first contact or dot matrix corner and a second contact or dot matrix corner in square dots is about 2% or higher. The percentage is defined by the formula:

$$\frac{\text{number of pixels to be blackened}}{\text{number of pixels constituting one dot}} \times 100$$

According to another aspect of this invention, there is provided a method for forming halftone data which is characterized in that when an original comprising color images of a continuous tone is scanned to obtain image signals, and the image signals are superposed with halftone screen signals which are electrically generated in order to form multicolor separated halftone gradation images which are reproducible by printing, the difference in dot percentage between one stage of dot where blackening starts and another stage or where whitening ends is about 2% or higher.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a chart to show examples of halftone data with the line number of 170 LPI;

FIG. 8 is a view to show an embodiment of a dither matrix (dot screen signals);

FIG. 10 is a chart to explain the halftone screen signals;

FIGS. 14A–14C and 16A–16E are charts to explain a tone jump or blackened pixels when the dither matrix shown in FIG. 8 is used;

FIGS. 15A–15D, 17A–17E and 18A–18E are views to describe operations when the dither matrix according to this invention is used;

FIGS. 19 and 21 are charts to show embodiments of a dither matrix obtained according to this invention, respectively.

DESCRIPTION OF THE PREFERRED EMBODIMENTS

According to this invention, when separated halftone gradation images of C, M, Y and K are being formed, a light spot of predetermined size is exposed to light and scanned while the number of pitches is being restricted in order to obtain an arbitrary number of the screen lines. Since the number of the screen lines is defined with the number of pitches, this invention method may easily be applied to color scanners of the flat bed type with conventional screen angles and dot patterns.

According to this invention, halftone screen signals or data of a dither matrix are re-arranged in order to prevent tone jumps when the images are outputted.

The control of the number of pitches which is a presupposition of this invention will first be explained.

Figure 5:
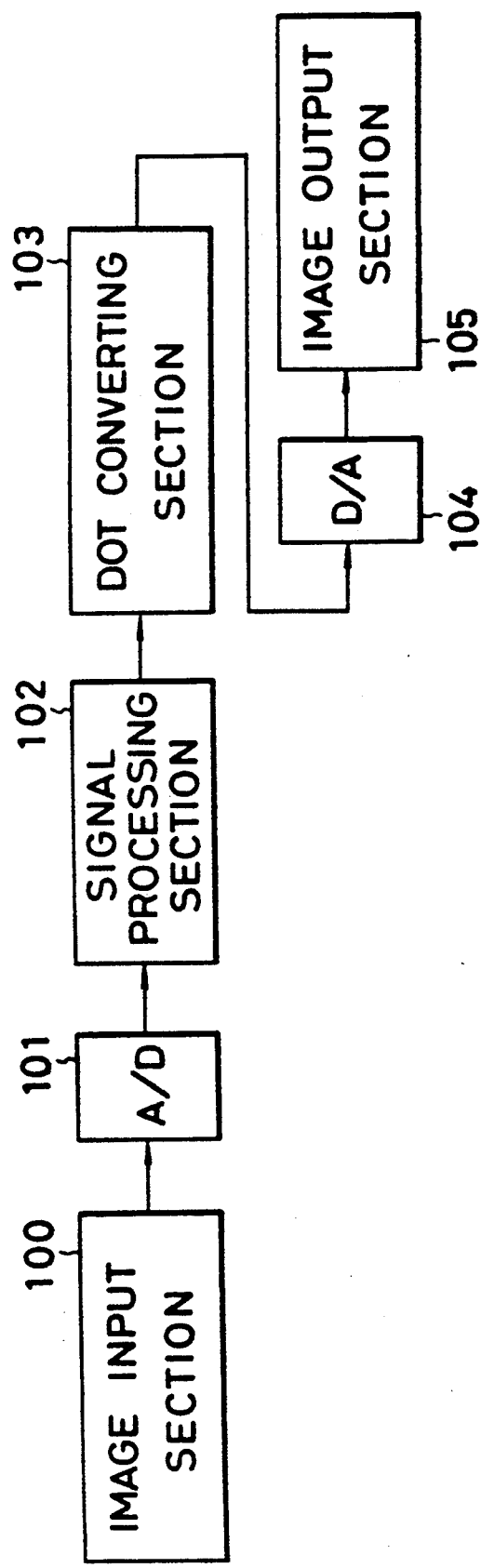
FIG. 5 is a block diagram to show an embodiment of image recording system in structure.

It is assumed that the angles of the four plates of C, M, Y and K are selected to be 0°, 15°, 45° and 75°, and the Y-plate is allotted at the angle 0°, and the other three plates of C, M and K are allotted at the remaining three angles respectively. It is known emperically that the Moiré pattern by the Y-plate is not visually recognizable, and therefore the Moiré pattern caused by the remaining plates of C, M and K, should be dealt with. The angles 15° and 75° are more precisely expressed as 18.4° and 71.6° when $m/n = \frac{1}{3}$ as shown in FIG. 5 if the screen is formed by a rational tangent. Therefore, the two angles 15° and 75° are symmetrical in respect of the angle 45°.

The primary Moiré pattern caused with the screens of 15° and 75° will now be discussed.

Figure 1:
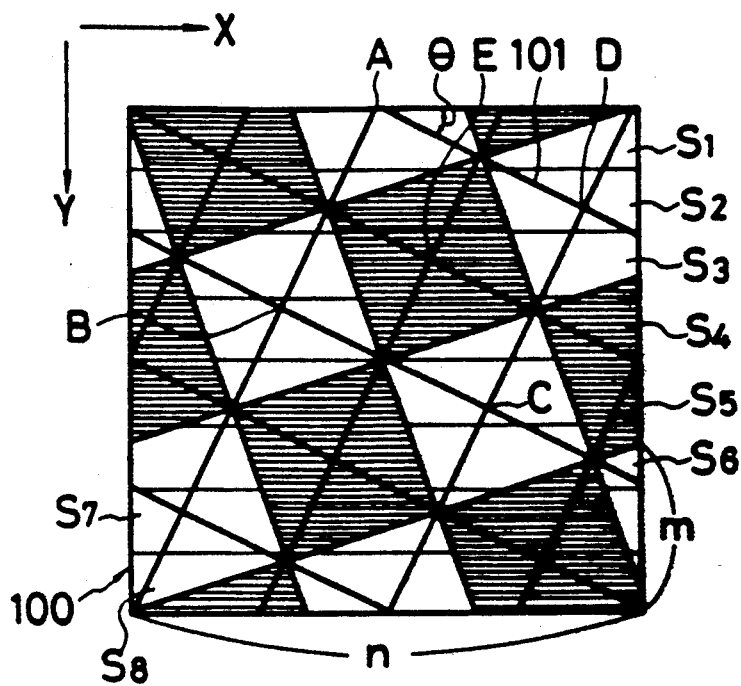
FIG. 1 is a chart to show a basic periodic section of a halftone screen.
Figure 2:
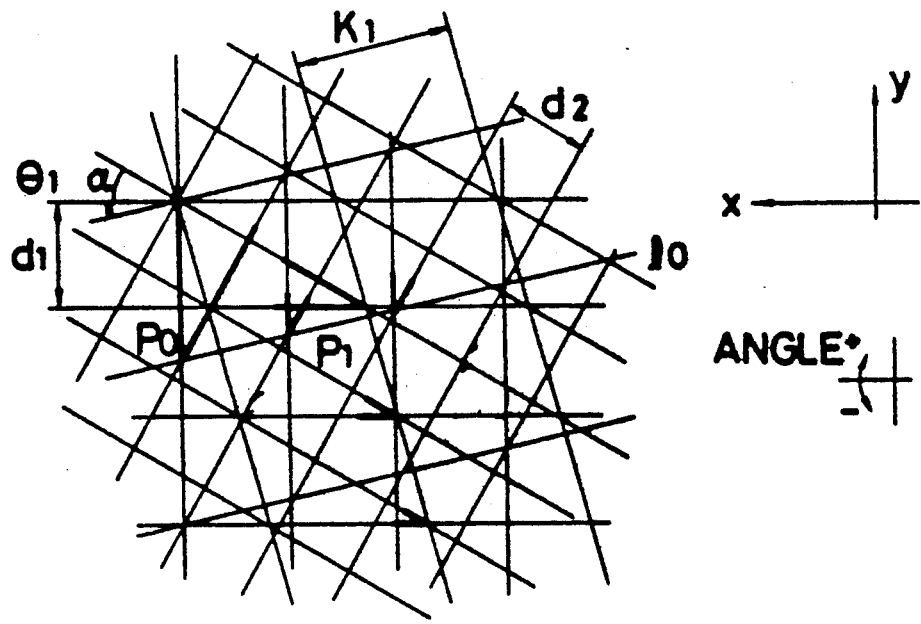
FIGS. 2 and 3 are views to show examples of patterns respectively.
Figure 3:
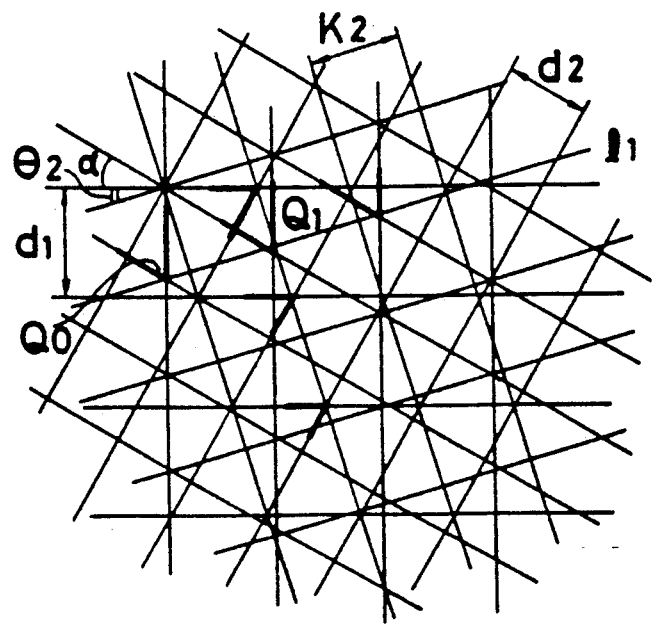

It is assumed that a Moiré pattern of period $K_1$ is formed at an angle $\theta_1$ in respect of the horizontal line in FIG. 2 and the same Moiré pattern of the period $K_2$ is formed at an angle $\theta_2$ in FIG. 3 wherein the period of the first screen shown in FIG. 2 is denoted as $d_1$ and that of the second screen in FIG. 3 is denoted as $d_2$, and the angle formed between the two screens is denoted as $\alpha$. The coordinate axes of x and y are plotted using the first screen as the reference. The points $P_0$ and $P_1$ are expressed in coordinates in FIG. 2 as below.

$$\left.\begin{array}{l} P_0(0, p_0) \\ P_1(-d_1, p_1) \end{array}\right\} \quad (1)$$

$$p_0 = -d_2/\sin\alpha \quad (2)$$

$$p_1 = 2p_0 + d_1 \cdot \cot\alpha \quad (3)$$

The inclination of a straight line $l_0$ connecting the points $P_0$ and $P_1$ is expressed as below.

$$\tan\theta_1 = \frac{p_0 - p_1}{d_1} = \frac{d_2 - d_1 \cdot \cos\alpha}{d_1 \cdot \sin\alpha} \quad (4)$$

$$K_1 = |p_0 \cdot \cos\theta_1| = \left|\frac{d_2}{\sin\alpha} \cdot \cos\left(\tan^{-1}\frac{d_2 - d_1 \cdot \cos\alpha}{d_1 \cdot \sin\alpha}\right)\right| \quad (5)$$

Similarly, the coordinates of the points $Q_0$ and $Q_1$ in FIG. 3 are expressed as below.

$$\left.\begin{array}{l} Q_0(0, q_0) \\ Q_1(-d_1, q_1) \end{array}\right\} \quad (6)$$

$$q_0 = -d_2/\cos\alpha \quad (7)$$

$$q_1 = -d_1 \cdot \tan\alpha \quad (8)$$

The inclination of the straight line $l_1$ connecting the points $Q_0$ and $Q_1$ is expressed as below.

$$\tan\theta_2 = \frac{q_0 - q_1}{d_1} = \frac{d_1 \cdot \sin\alpha - d_2}{d_1 \cdot \cos\alpha} \quad (9)$$

$$K_2 = |q_0 \cdot \cos\theta_2| = \left|\frac{d_2}{\cos\alpha} \cdot \cos\left(\tan^{-1}\frac{d_1 \cdot \sin\alpha - d_2}{d_1 \cdot \cos\alpha}\right)\right| \quad (10)$$

Although the Moiré patterns with short periods are acceptable Moiré patterns, they would appear as conspicuous patterns with a higher period. It is therefore desirable that the angle α formed between the screens should be within ±15° from 45° or in the scope ranging from 30° to 60°.

Figure 4:
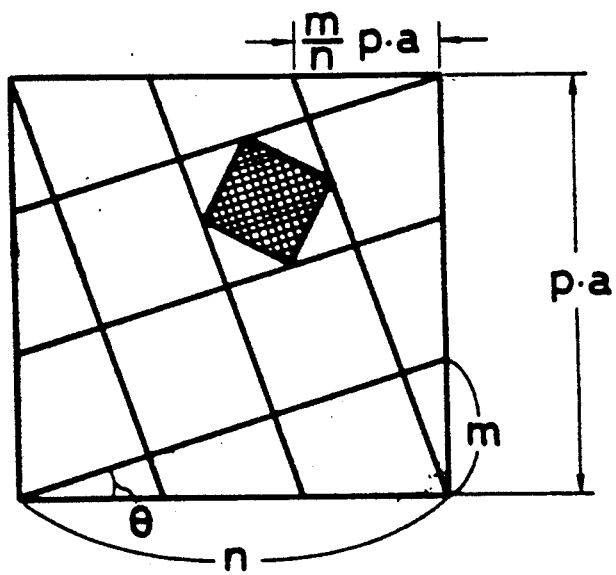
FIG. 4 is a view to show an embodiment of dots with a rational tangent.

The relation between the primary Moiré pattern of 45° produced superposing two plates (15° and 75°) and the 45° screen or the third plate is discussed as the mechanism to produce a Moiré pattern. The parameters of rational tangent as shown in FIG. 4 are given by (m, n, a), and if m<n, the angles corresponding to 15° and 75° respectively are $\tan^{-1}$ (m/n) and $\tan^{-1}$ (n/m). When p denotes a scanning pitch and a denotes a constant which is an integer, a square of p×a becomes the minimum unit of repetitive patterns. The numbers m, n and a are integers, and the numerical values are given in a manner to satisfy the following formula or the conditions to dissolve a single Moiré pattern disclosed in Japanese Patent Laid-open (kokai) No. 18856 4/1987 wherein γ is an integer.

$$a = \frac{m^2 + n^2}{n} \cdot \gamma \quad (11)$$

The primary Moiré pattern produced by the two plates of 45°±(30°±Δθ) (provided, however, the angles 15° and 75° are nominal angles) takes place precisely at 45°. The sufficient condition to prevent occurrence of the secondary Moiré pattern is the condition to the period of the primary Moiré pattern agree with the dot interval of the third plate of 45°. If the numerals $n_0$, $m_0$ (<$n_0$), $a_0$ are integers, they become (m, n, a)=($m_0$, $n_0$, $a_0$) at or close to 15°, (m, n, a)=($n_0$, $m_0$, $a_0$) or symmetrical at or close to 75°, and (n, m, a)=(1, 1, $a_1$) at or close to 45°. The line interval $d_{15}$ at 15° becomes as expressed in equation (12) below.

$$d_{15} = \frac{p \cdot a_0}{\sqrt{m_0^2 + n_0^2}} \quad (12)$$

The line interval $d_{45}$ at 45° is expressed as below.

$$d_{45} = p \cdot a_1/\sqrt{2} \quad (13)$$

The real angle $\theta_{15}$ for 15° is expressed as below.

$$\theta_{15} = \tan^{-1}(m_0/n_0) \quad (14)$$

The real angle $\theta_{75}$ at 75° is expressed as below.

$$\theta_{75} = \tan^{-1}(n_0/m_0) \quad (15)$$

If the primary Moiré pattern is formed with patterns of 15° and 75° in the direction of 45°, the following relations (16) and (17) are obtained.

$$\alpha = \theta_{75} - \theta_{15} \quad (16)$$

$$d_1 = d_2 = d_{15} \quad (17)$$

By substituting these in the above formula (5), the period K of the Moiré pattern formed will be;

$$\begin{aligned} K &= \frac{d_0}{(n_0^2 - m_0^2)/(m_0^2 + n_0^2)} \cdot \sqrt{\frac{(m_0 + n_0)^2}{2(m_0^2 + n_0^2)}} \\ &= \frac{p \cdot a_0}{\sqrt{m_0^2 + n_0^2}} \cdot \frac{m_0^2 + n_0^2}{n_0^2 - m_0^2} \cdot \frac{m_0 + n_0}{\sqrt{2(m_0^2 + n_0^2)}} \\ &= \frac{p \cdot a_0}{\sqrt{2}(n_0 - m_0)} \end{aligned} \quad (18)$$

The condition to prevent the secondary Moiré pattern is the complete agreement between the period of the primary Moiré pattern with the period of 45° screen or in other words, the formulas (13) and (18) are fully agreed.

$$K = d_{45} \quad (19)$$

As the formula (20) holds, the relation holds as expressed by a equation (21).

$$a_1 = \frac{a_0}{n_0 - m_0} \quad (20)$$

$$a_0 = (n_0 - m_0) \cdot a_1 \quad (21)$$

TABLE 1

| nominal line number | 45° a. | real line number | 15°/75° m/n. | a. | real line number | real angle |
|---|---|---|---|---|---|---|
| 65 LPI | a = 50, | 63.9 LPI | 1/3 | a = 100, | 71.4 LPI, | 18.4°/71.6° |
| 65 LPI | a = 51, | 62.6 LPI | 1/4 | a = 153, | 60.8 LPI, | 14.0°/76.0° |
| 85 LPI | a = 40, | 79.8 LPI | 1/3 | a = 80, | 89.2 LPI, | 18.4°/71.6° |
| 100 LPI | a = 35, | 91.2 LPI | 1/3 | a = 70, | 102.0 LPI, | 18.4°/71.6° |
| *120 LPI | a = 27, | 118.3 LPI | 5/18 | a = 349, | 120.9 LPI, | 15.5°/74.5° |
| *120 LPI | a = 26, | 122.8 LPI | 5/17 | a = 314, | 127.4 LPI, | 16.4°/73.6° |
| 133 LPI | a = 25, | 127.7 LPI | 1/3 | a = 50, | 142.8 LPI, | 18.4°/71.6° |
| *150 LPI | a = 22, | 145.1 LPI | 4/15 | a = 241, | 155.4 LPI, | 4.9°/75.1° |
| 175 LPI | a = 20, | 159.6 LPI | 1/3 | a = 40, | 178.5 LPI, | 18.4°/71.6° |
| 175 LPI | a = 17, | 187.8 LPI | 1/4 | a = 51, | 182.5 LPI, | 14.0°/76.0° |

Based on the above formula (21), the number of screen lines usable at the scanning pitch p=11.25 μm is calculated, and the result is shown in Table 1. Those marked with asterisk "*" represents Moiré patterns with relatively longer periods while the rest represent the conditions where no Moiré pattern is formed. Even with the conditions marked with "*", they would not present a significant problem in practice as their period is long. Especially on the lines of 150 and 120, there is no combination which does not form Moiré pattern at the scanning pitch of 11.25μ. The number of screen lines of 150 and 120 lines can be obtained by using 12.5 μm as the scanning pitch or 10/9 times of 11.25 μm.

TABLE 2

| nominal line number LPI | pitch p (μm) | 0° | | 45° | | 15°/75° | | | |
|---|---|---|---|---|---|---|---|---|---|
| | | $a_0$ | $l_0$ | $a_{45}$ | $l_{45}$ | m/n | angle | $a_{15}$ | $l_{15}$ |
| 65 | 22.5 | 17 | 66.4 | 25 | 63.9 | 1/3 | 18.4°/71.6° | 50 | 71.4 |
| 85 | 22.5 | 13 | 86.8 | 20 | 79.8 | 1/3 | 18.4°/71.6° | 40 | 89.2 |
| 100 | 12.5 | 20 | 101.6 | 30 | 95.8 | 1/3 | 18.4°/71.6° | 60 | 107.1 |
| 120 | 12.5 | 17 | 119.5 | 25 | 114.9 | 1/3 | 18.4°/71.6° | 50 | 128.5 |
| 133 | 11.25 | 17 | 132.8 | 25 | 127.7 | 1/3 | 18.4°/71.6° | 50 | 142.8 |
| 150 | 12.5 | 14 | 145.1 | 20 | 143.7 | 1/3 | 18.4°/71.6° | 40 | 160.6 |
| 175 | 11.25 | 13 | 173.7 | 20 | 159.6 | 1/3 | 18.4°/71.6° | 40 | 178.5 |
| 200 | 12.5 | 10 | 203.2 | 15 | 191.6 | 1/3 | 18.4°/71.6° | 30 | 214.2 |

The Table 2 shows the results of combination of the screen lines obtained by the scanning pitches 11.25 μm and 12.5 μm.

In the second Table 2, the coarse screen line numbers 65 and 85 use the pitch of 11.25 μm which is twice as much as 11.25 μm. If the scanning pitch P is selected to be 2.25 μm, then arbitrary number of the screen lines may be selected with four colors without Moiré patterns, but the realization of the scanning pitch 2.25 μm has two problem. One problems lies in the difficulty to focus the light beam (light spot) at 2.25 μm and the other problem is that the scanning speed becomes too slow with the scanning pitch of 2.25 μm while the data capacity increases remarkably. Because of the above two reasons, selection of a scanning pitch as small as 2.25 μm is not suitable.

FIG. 5 shows the structure of a system which reads images with a color scanner or the like, processes them in halftone and records them in images. More particularly, the image signals read by an image input section 100 are digitized by an A/D converter 101, processed for gradation conversion, contour emphasis and so on by a signal processing section 102 and inputted to a dot converting section 103. The image data which are converted into dots by the dot converting section 103 are inputted to a D/A converter 104, converted into analog values and recorded in images by an image output section 105.

An light beam scanning apparatus as the image output section 105 are described below.

Figure 6:
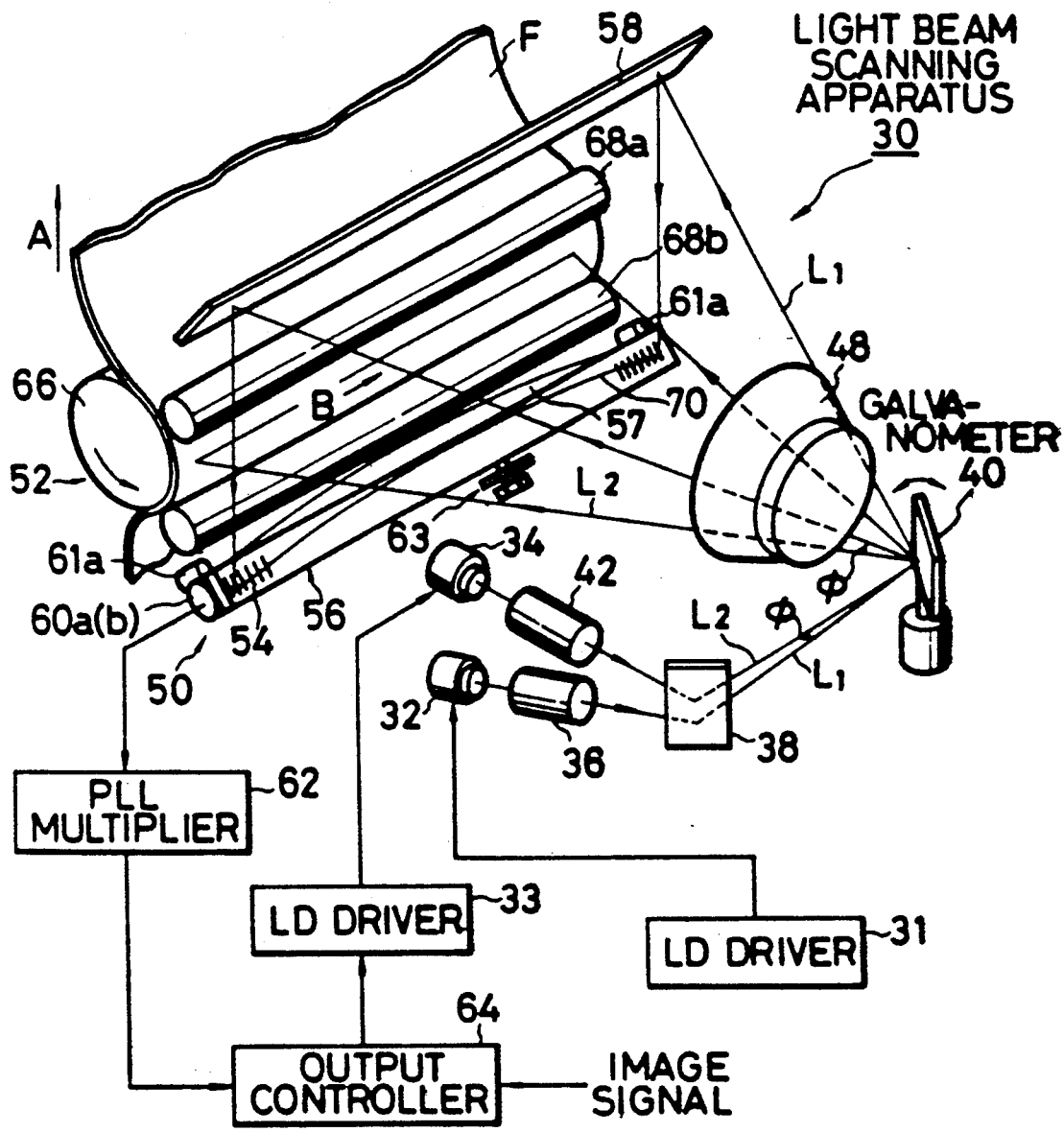
FIG. 6 is a structural view to show an embodiment of a light beam scanning apparatus.

FIG. 6 shows the light beam scanning apparatus 30 comprises a laser diode 32 which outputs laser beam $L_1$ for synchronization under the control of LD driver 31, and a laser diode 34 which outputs laser beam $L_2$ for recording under the control of an LD driver 33. The laser beam $L_1$ for synchronization which is outputted from the laser diode 32 is directed to a galvanometer mirror 40 via a collimator 36 and a mirror 38. The laser beam $L_2$ for recording which is outputted from the laser diode 34 is directed to the galvanometer mirror 40 at an angle $\phi$ in respect of the laser beam $L_1$ for synchronization via a collimator 42 and the mirror 38. The galvanometer mirror 40 deflects the laser beam $L_1$ for synchronization and the laser beam $L_2$ for recording through reflection when the mirror is vibrated at a high speed. The laser beams $L_1$ and $L_2$ which have been reflected and deflected by the galvanometer mirror 40 are directed respectively to a synchronization signal generator 50 and an image recording section 52 via a scanning lens 48 comprising an fθ lens. The synchronizing laser beam $L_1$ enters the scanning lens 48 at an incident angle of $\phi$ in respect of the optical axis and directed to the synchronizing signal generator 50 via the peripheral side of the scanning lens 48. The recording laser beam $L_2$ enters the scanning lens 48 within the plane including the optical axis and directed to the image recording section 52 via the center of the scanning lens 48.

The synchronizing signal generator 50 includes grids 56 which are formed with a large number of slits 54 at uniform intervals in the scanning direction of the synchronizing laser beams $L_1$, and the synchronizing laser beams $L_1$ is directed into the grids 56 via a mirror 58. A light condensing rod 57 is provided on the back surface of the grids 56, and the synchronizing laser beam $L_1$ is directed to photodetectors 60a and 60b on both sides of the rod via the light codensing rod 57 and converted into electric signals. The electric signals from the photodetectors 60a and 60b are multiplied by a PLL (Phase Locked Loop) multiplier 62 and supplied to an output controller 64 as a synchronizing signal. The output controller 64 controls the LD driver 33 based on the synchronizing signals and image signals. As shown in Table 2, once the number of screen lines and screen angles are determined, the step proceeds to designing a dot pattern.

Figure 9:
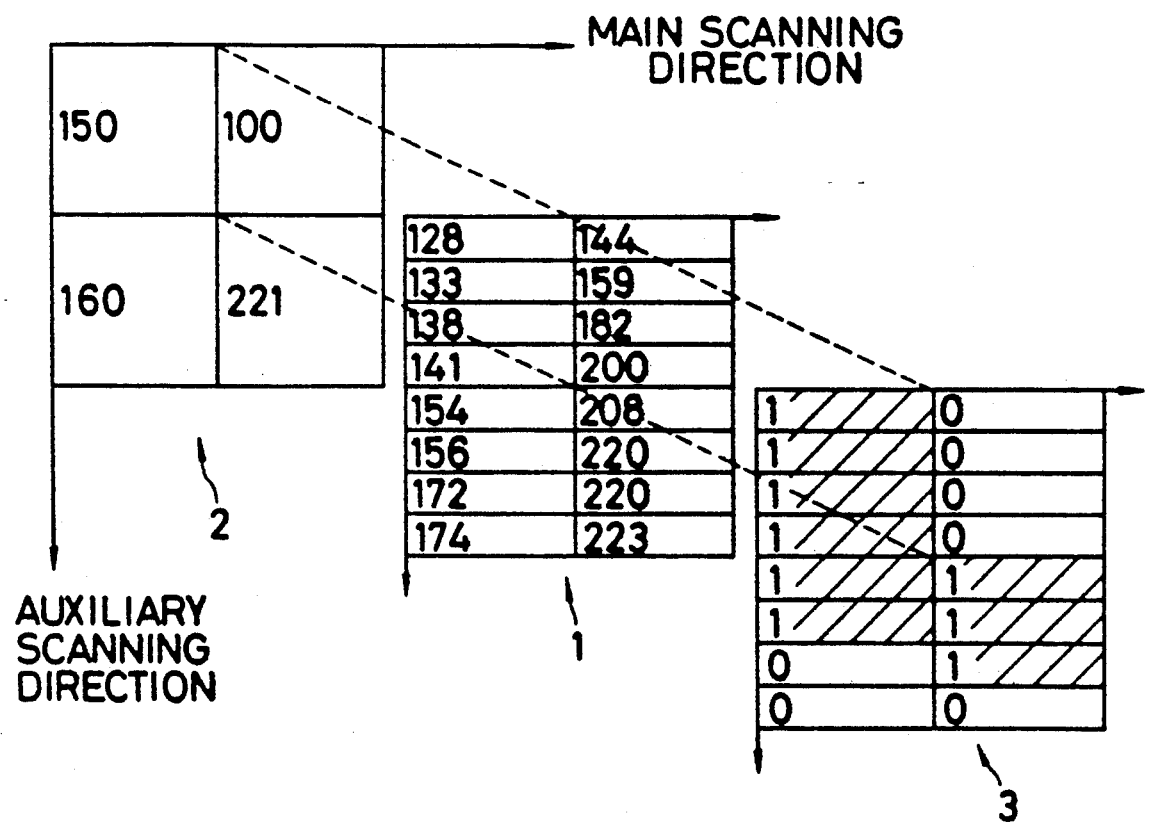
FIG. 9 is a view to show a condition under which halftone data is being generated.

FIG. 7 shows a dot pattern (template or dither matrix) of 0° with 175 line. For each of the combinations of the screen line numbers and screen angle shown in Table 2, dot patterns (template data) as shown in FIG. 7 or in practice as shown in FIG. 8 are designed and used for formation of the halftone screens. The template data are usually stored either in a floppy disc or the ROM of the image output section 105, and at the point in time when the number of screen lines and the screen angle are selected, a scanning pitch p is selected from the table and a circuit is set to be controlled with the selected pitch p. The data of the template data is read out in a RAM region. As shown in FIG. 9, with the template data 1 and the image signals 2, halftone data 3 is formed. Referring to FIG. 9, the template data 1 which are read out are compared to the image data 2, and when the image data 2 are larger, "1" is outputted, and when they are smaller, "0" is outputted. In this manner, the halftone data 3 is obtained with which light is modulated to expose a photosensitive material to obtain a halftone plate.

The method for forming a halftone screen by the dot converting section 103 is described below.

Figure 10:
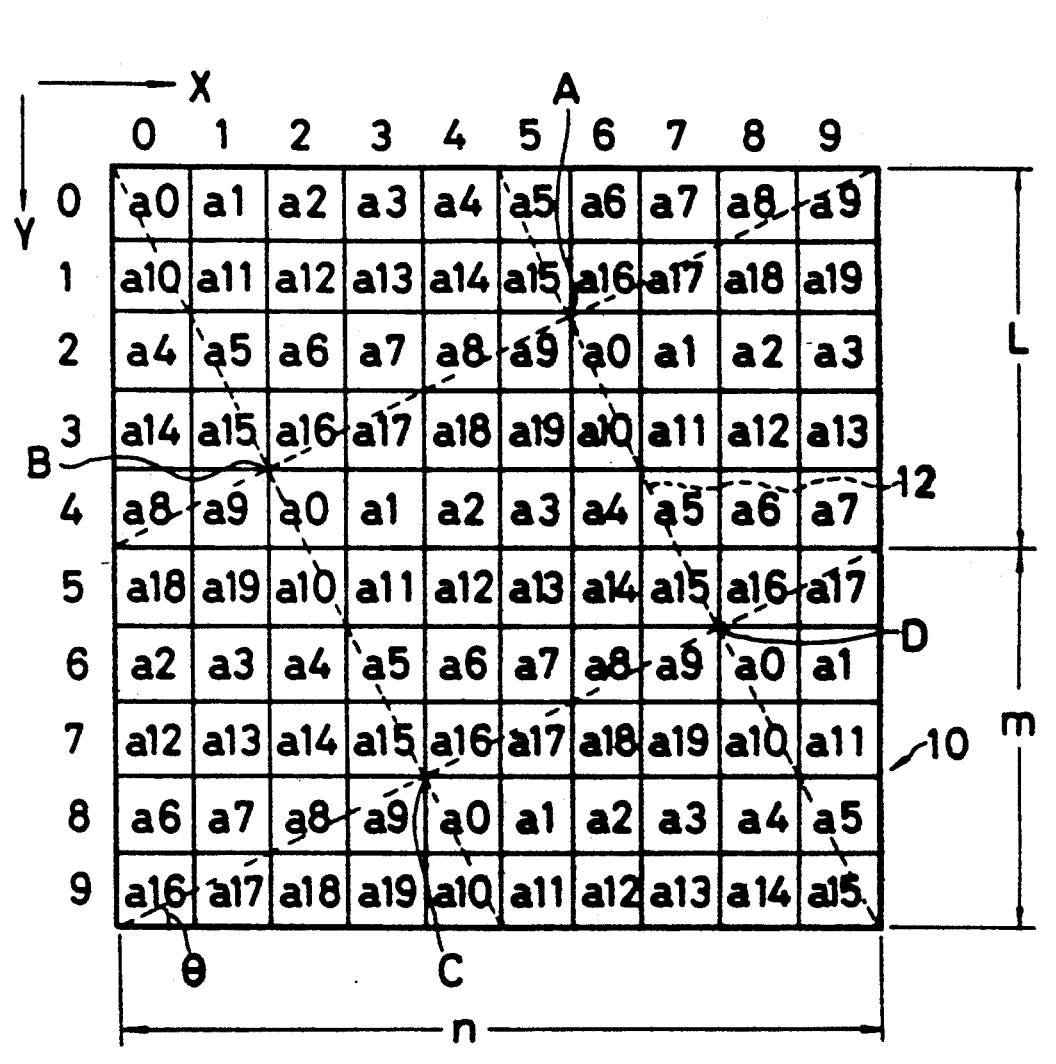

FIG. 10 shows an example of the halftone screen signals wherein a basic periodic section 10 of a halftone screen comprising 100-halftone data is shown. In this case, the basic periodic section 10 is defined with the points A through D to be a halftone section 12 at a screen angle θ.

The basic periodic section 10 including the halftone section 12 may become the minimum unit of the halftone screen only when the screen angle θ holds the relation below with the rational tangent wherein n and m are integers.

$$\tan\theta = \frac{m}{n} \tag{22}$$

Further, the relation below is required to hold as the basic periodic section 10 should have halftone data of the number of an integer in the directions X and Y.

$$n \cdot L = \alpha \cdot P \tag{23}$$

wherein n·L denotes a length either in the X direction or the Y direction of the basic periodic section 10 when a side of a square forming the halftone section 12 in either the X direction or the Y direction is denoted as L; P denotes a width of the halftone block formed with a halftone data, and α denotes the number of the halftone data forming the basic periodic section 10 in either the X direction or the Y direction.

The data forming the halftone section 12 with the points A through D need to be structured with the same halftone data in order to prevent occurrence of regular patterns in reproduced images. More specifically, it is necessary to provide the halftone data of an integer between the points A and B both in the directions X and Y. If the distance between the points A and B in the direction of Y is denoted as l, and γ is an integer, the relation holds as below.

$$l = \gamma P \tag{24}$$

The similar relation can also be obtained in respect of the direction X. The distance l in the above case can be expressed as below.

$$l = L \cdot \cos^2\theta \cdot \tan\theta \tag{25}$$

From the formulas (23), (24) and (25), the relation below holds.

$$\frac{\gamma}{\alpha} = \frac{\tan\theta}{n \cdot (1 + \tan^2\theta)} \tag{26}$$

When the relation holds as expressed in the formula (26), the basic periodic section 10 can be structed by repeating generating the halftone data between the points A and B in the direction Y. When the number of halftone data forming the basic periodic section 10 is determined so as to arrange the halftone data of an integer between the points A and B, the basic periodic section 10 can be expressed with the halftone in an amount of γ/α determinable by the formula (5). For instance, in the case shown in FIG. 10, as the relation holds as $\tan\theta = \frac{1}{2}$, n=2, γ/α becomes 1/5, and the basic periodic section 10 can be expressed with twenty halftone data $a_0$ through $a_{19}$ of which amount is one fifth of the data.

Based on the halftone data $a_0$ through $a_{19}$ forming the basic periodic section 10 shown in FIG. 10, the method for generating the halftone gradation image signals from the continuous tone image signal will be described.

Figure 11:
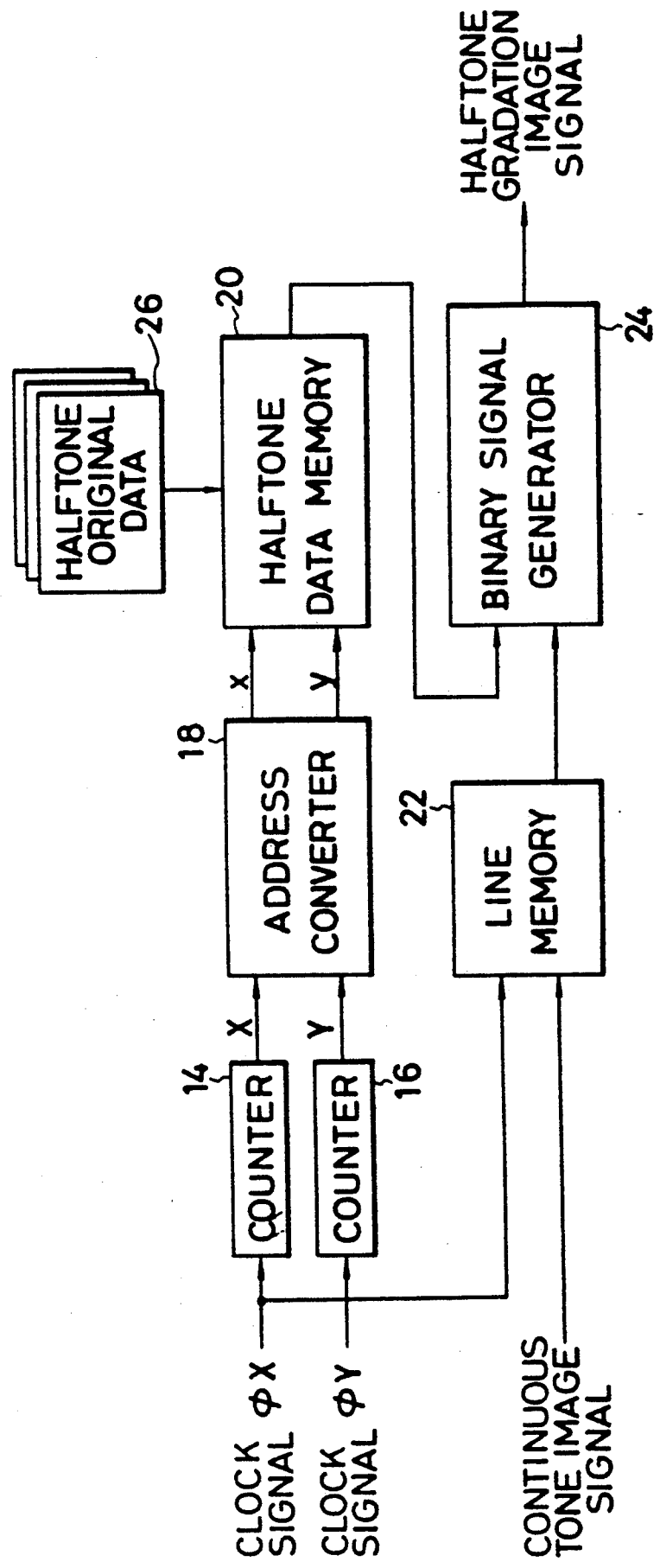
FIG. 11 is a block diagram to show a circuit which generates halftone gradation image signals.
Figure 12:
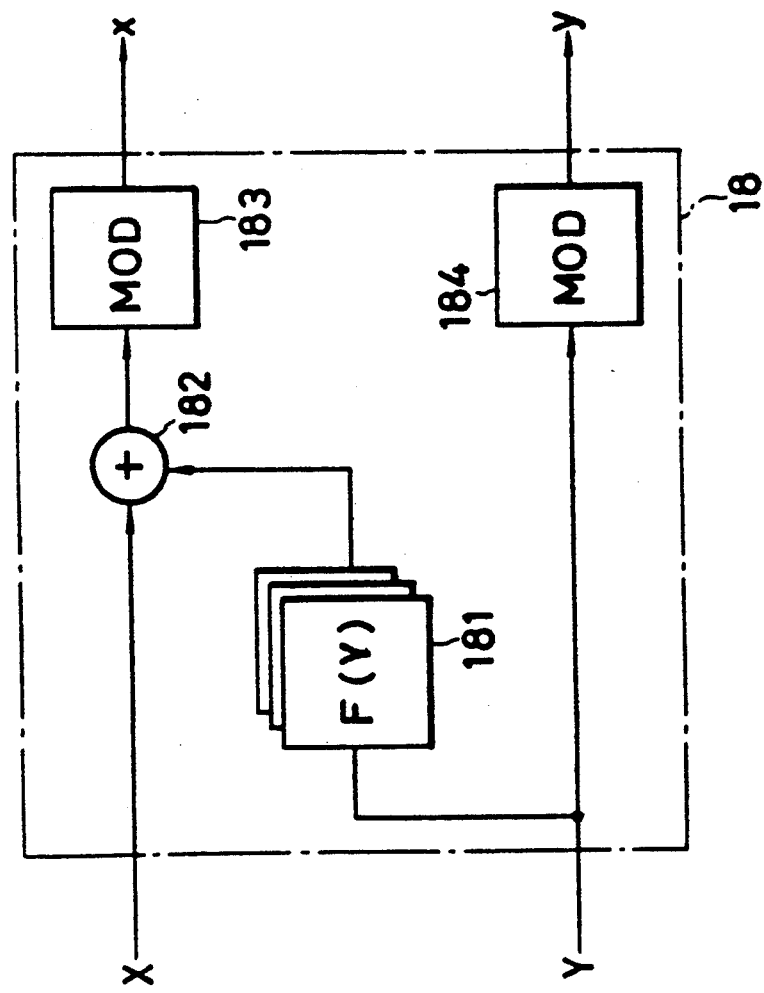
FIG. 12 is a block diagram to show the detail of an address converter.

FIG. 11 shows an embodiment of a circuit which is used to generate the halftone gradation image signals. The circuit comprises two counters 14 and 16, an address converter 18, a halftone data (dither matrix data) memory 20, a line memory 22 and a binary signal generator 24. Out of preset plural halftone original data 26 selected desirable ones depending on the level of the halftone resolution and the screen angle θ to be transferred and stored in the halftone data memory 20. The counter 14 counts the clock signal $\phi_X$ in the main scanning direction of the continuous tone images and supplies them as an address signal X to the address converter 18. The counter 16 counts the clock signal $\phi_Y$ in the auxiliary scanning direction of the continuous tone images and supplies them to the address converter 18 as an address signal Y. The address converter 18 converts the address signals (X, Y) of the halftone data at the basic periodic section 10 into the address signals (x, y) of the halftone data $a_0$ through $a_{19}$ stored in the halftone data memory 20 and is structured as shown in FIG. 12. More specifically, the address converter 18 includes a remainder calculating section 183 to which the address signal X is supplied via an adder 182 and a remainder calculating section 184 to which address signal Y is supplied. The adder 182 is supplied with an adding signal F(Y) selected by the address signal Y from an off-set table 181. The off-set table 181 comprises plural data which are determinable by combination of the screen angle θ and the halftone resolution level similarly in the case of the halftone original data 26. The remainder calculating section 183 calculates the address signal x based on the equation below.

$$x = MOD(X + F(Y), N_x) \tag{27}$$

wherein $N_x$ denotes the number of the halftone data in the direction X

The remainder calculating section 184 calculates the address signal y based on the fonmula below.

$$y = MOD(Y, N_y) \tag{28}$$

wherein $N_y$ denotes the number of the halftone data in the direction of Y.

The line memory 22 is supplied with the continuous tone image signals and the clock signal $\phi_x$ in the main scanning direction, and the outputs from the line memory 22 and the halftone data memory 20 are supplied respectively to the binary signal generator 24. The binary signal generator 24 compares the halftone data with the image signals and outputs the results of comparison as the halftone gradation image signals.

A method to convert the continuous tone image signals into the halftone gradation image signals by using the basic periodic section 10 shown in FIG. 10 is described below.

Figure 13:
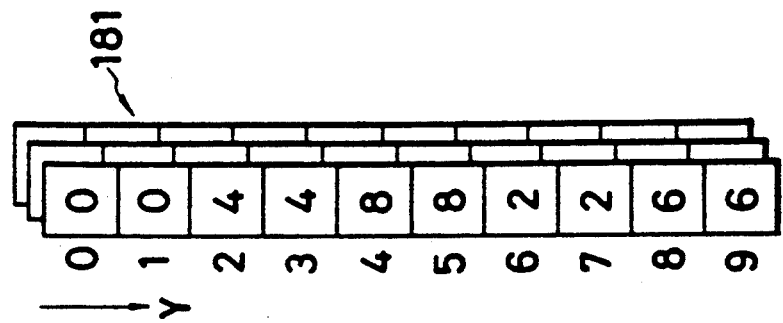
FIG. 13 is a chart to show an embodiment of the off-set table.

Halftone data of various levels of the screen angle θ and the halftone resolution are stored in the halftone original data 26. Out of these data, the halftone data $a_0$ through $a_{19}$ are selected and loaded at the address (x, y) in the halftone data memory 20. The address (x, y) is set within the range (0, 0) through (9, 1). Therefore, when an address signal (X, Y) from the counters 14 and 16 based on the clock signals $\phi_x$ and $\phi_y$ are inputted to the addres converter 18, the address converter 18 converts the address signals (X, Y) into the address signals (x, y) of the halftone data $a_0$ through $a_{19}$. In other words, in the case of (X, Y) = (0, 0), as the adding signal F(Y) is set at "0" in the off set table 181 shown in FIG. 13, the output signals from the remainder calculating section 183 and 184 become respectively "0" due to the relation expressed in formulas (27) and (28). Therefore, the address converter 18 accesses the halftone data $a_0$ at the address (x,y) = (0,0) from the halftone data memory 20 and supplies the data to the binary signal generator 24. When the address signal (X, Y) from the counters 14 and 16 is (0, 2), the address signal F(Y) becomes "4" based on the relation shown in FIG. 13, and therefore (x,y) become (4,0) from the relation held in the formulas (27) and (28). Accordingly, the address converter 18 selects the halftone data a₄ out of the halftone data a₀ through a₁₉ stored in the halftone data memory 20, and supplies the data to the binary signal generator 24. Similarly, all of the halftone data a₀ through a₁₉ which form the basic periodic section 10 are sequentially supplied to the binary signal generator 24.

The binary signal generator 24 is supplied with the continuous tone image signal based on the clock signal $\phi_x$ from the line memory 22 in addition to the halftone data a₀ through a₁₉. The binary signal generator 24 compares the halftone data a₀ through a₁₉ with the continuous tone image signals, and outputs the result of the comparison in the form of the halftone gradation image signals or ON/OFF signals. The halftone signals are converted into optical signals such as laser beams and irradiated on a film by a device shown in FIG. 6 to become the halftone gradation images.

In the halftone screen or the dither matrix mentioned above, a tone jump tends to occur usually near 50% in a square dot. This is attributable to the fact that the scanning beam has an extensive width, and therefore the tone jump tends to occur at a level from which blackened portions start to be coupled between adjacent dots. In a case where a dither matrix is used as FIG. 8, the ratio of the blackened portion increases in the process FIGS. 14A→14B→14C or FIGS. 16A→16B→16C→16D→16E. In order to prevent the tone jump from occurring in the blackening process as above, the dither matrix is formed as shown in FIG. 19 with a difference in percentage of blackened pixels between the first and the second corners by first connecting one set of corners and then the other set of corners as shown in FIG. 15B to form a square pattern as shown in FIG. 15C. The required difference in dot percentage is about 2% or more. The dot shapes at various levels of the halftone data will become as shown in FIGS. 17A through 17E when the dither matrix is used.

Figure 20:
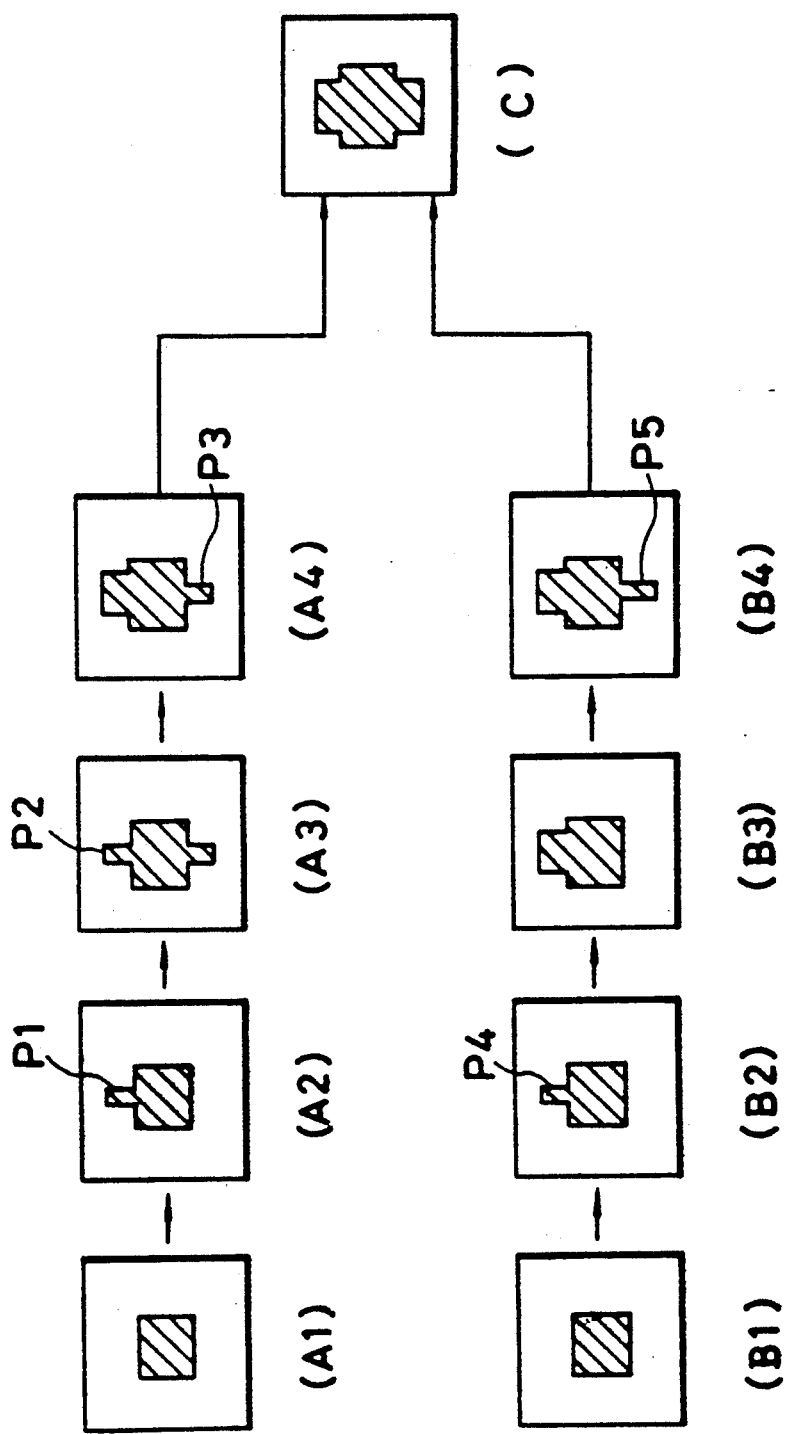
FIG. 20 is a view to explain a tone jump.

In dots, the tone jump tends to occur at the level where the blackening starts in the main scanning direction. This is because due to the extensive width of the scanning beam, the dot area does not increase smoothly. When the dither matrix is used as shown in FIG. 8, the tone jump were likely to occur in the process of (A1)-→(A2) or (A2)→(A3) in FIG. 20. In the conditions shown above, as levels are set close to each other, it is more likely to produce tone jumps. P1 through P5 in FIG. 20 show respectively the minimum unit of dot structure. FIG. 21 shows the dither matrix wherein the difference in dot ratio between the dots where the blackened portion starts in the main scanning direction or between dots where the whitened portion ends is 2% or higher to prevent the tone jumps. When the dither matrix of FIG. 21 was used, the tone jumps tended to occur at the transitions from (B1)→(B2) and (B3)→(B4) in FIG. 20, but as the levels of (B1→(B2) and (B3)→(B4) were separated to a certain extent, the number of the tone jumps was less than the dither matrix in FIG. 8 as the whole halftone gradation. As to the whitened portion, the similar fact applied only if the relation of negative vs. positive is reversed. The halftone data assumes the forms as shown in FIG. 18A through FIG. 18E at various levels of the halftone data when the dither matrix of FIG. 21 was used. In FIGS. 16 through 18, the letter (A) represents level where the pixels that are blackened are numbers 1 through 4, (B) numbers 1 through 5, (C) numbers 1 through 13, (D) numbers 1 through 19, and (E) numbers 1 through 25.

As is described in detail in the foregoing statement, this invention method for forming halftone data can provide a desirable number of screen lines by exposing and scanning a predetermined size of a light spot at a predetermined pitch and by controlling the number of pitches when a multi-colored separated halftone gradation images are formed by combining all of C,M,Y and K or any two or more colors thereof, and prevent occurrence of the tone jumps by re-arranging the dither matrix or screen signals thereof.

It should be understood that many modifications and adaptations of the invention will become apparent to those skilled in the art and it is inteded to encompass such obvious modifications and changes in the scope of the claims appended thereto.

What is claimed is:

1. In a method for forming halftone data wherein an original comprising color images of a continuous tone is scanned to obtain image signals, and the image signals are superposed wwith halftone screen signals which are electrically generated in order to form multicolor separated halftone gradation images, comprising groups of dots whose sizes depend on density and are defined within a square dot matrix, said images being reproducible by printing, the improvement comprising:

controlling the shape of the dot defined within said square dot matrix to produce a difference of about 2% or higher in percentage of blackened pixels between a first corner of at least one square dot matrix and a second corner of at least one square dot matrix.

2. A method for forming halftone data as claimed in claim 1, wherein said difference in percentage is obtained by re-arranging data of a halftone screen signal.

3. A method for forming halftone data as claimed in claim 1, wherein said difference in percentage is obtained by re-arranging data of a dither matrix.

4. In method for forming halftone data wherein an original comprising color images of a continuous tone is scanned to obtain image signals and the image signals are superposed with halftone screen signals which are electrically generated in order to form multicolor separated halftone gradation images, comprising groups of dots whose sizes depend on density and are defined within a square dot matrix, said images being reproducible by printing, the improvement comprising:

controlling the shape of the dot defined within said square dot matrix to produce a difference of about 2% or higher in percentage of blackened pixels between one stage of dot within a dot matrix where a blackened portion starts and another stage of dot within a dot matrix where a whitened portion ends.

* * * * *